(12) United States Patent
Tseng (10) Patent No.: US 8,561,809 B2
(45) Date of Patent: Oct. 22, 2013

(54) PORTABLE QUICK FIT FILTER ASSEMBLY

(76) Inventor: Wei Cheng Tseng, Walnut, CA (US)

( * ) Notice: Subject to any disclaimer, the term of this patent is extended or adjusted under 35 U.S.C. 154(b) by 345 days.

(21) Appl. No.: 13/163,681

(22) Filed: Jun. 18, 2011

(65) Prior Publication Data
US 2012/0318725 A1   Dec. 20, 2012

(51) Int. Cl.
*B01D 35/02* (2006.01)
*B01D 35/30* (2006.01)
*B01D 35/00* (2006.01)

(52) U.S. Cl.
USPC ........... 210/449; 210/232; 210/440; 210/443; 210/464

(58) Field of Classification Search
USPC ......... 210/232, 449, 440–443, 453, 454, 460, 210/464
See application file for complete search history.

(56) References Cited

U.S. PATENT DOCUMENTS 5,300,223 A * 4/1994 Wright .......................... 210/232
5,700,371 A * 12/1997 Koslow ......................... 210/232

* cited by examiner

*Primary Examiner* — Nam Nguyen
*Assistant Examiner* — Madeline Gonzalez
(74) *Attorney, Agent, or Firm* — Maria Erlinda Co Sarno (57) ABSTRACT

A portable table top filter assembly including a filter housing enveloping a filter having an inlet and an outlet for the fluid; a flat bottomed filter base having an inlet port and an outlet port communicating with the inlet and outlet of the filter housing and a protruding rim having connectors on an outside surface of the rim recessed from the main body of the filter base, an inlet entry port at a bottom section of the filter base for connecting to a fluid source and communicating with the inlet port of the filter base, an outlet exit port connecting to a fluid delivery device and communicating with the outlet port of the filter base; and, a filter locking ring locking the filter housing to the filter base when a connector at the filter locking ring connects with the connector at the filter base.

15 Claims, 8 Drawing Sheets

FIG. 8  FIG. 8A

PORTABLE QUICK FIT FILTER ASSEMBLY

This invention relates to a portable table top fluid filter assembly that is easy to assemble and fits into an existing outlet.

BACKGROUND

Existing filter assemblies are hard to easily disassemble and assemble, often needing a wrench or a screw driver to open or tightly close the housing containing the filter to prevent leakage. This has made it difficult to change the filter inside the housing especially when minerals deposit around the area where the body of the housing connects with the cover. The filter assembly herein does not require any tools to open and is very simple in construction to enable one to install or change the filter with very little downtime. Present filter assemblies are also difficult to bring along when traveling. There are some countries where the ability to filter the local water would be recommended especially to those with a weak immune system. Further, it is lightweight, making it easy to transport the filter assembly from one fluid or liquid outlet to another requiring only accessories like an adapter if the outlet port of the fluid source like a faucet is not of a standard sized threaded opening. Fluid and liquid herein will be referred to simply as fluid. The rate of fluid contact or residence time of the fluid with the filter can be controlled with this assembly by controlling the rate of entry of the fluid to the filter housing and by providing replaceable outlet port with variable inside diameters. The filter media can be replaceable or it can be housed permanently and sealed in a housing when it is not replaceable. The sealed filter media in a housing is referred to herein as filter cartridge. When in a cartridge form, there is very minimal amount of fluid leaking out or dripping from the assembly when it is disassembled. The filter media used with this filter assembly is variable based on its intended usage and is not claimed. The invention rest on the construction and design of the filter assembly without a claim on the filter used.

It is the object of this invention to provide a filter assembly that is easy to assemble and disassemble without the use of tools.

It is also an object of this invention to provide a filter assembly that is designed to keep fluids from dripping or leaking out of the housing during disassembly.

It is also a further object of this invention to provide a filter assembly that is table top, portable and easy to fit into fluid outlets.

SUMMARY OF THE INVENTION

A portable counter top fluid filter assembly, comprises a filter housing having a bottom cover and a hollow domelike cover enveloping a filter attaching to the bottom cover an inlet and an outlet for the fluid; a filter base having a main body including a cylindrical trough-like top section having a flat interior surface, an inlet port and an outlet port, an elevated flat ring at the flat interior surface periphery, an upright protruding rim extending from the flat interior surface of the filter base proximal to the periphery, the protruding rim having female receptors on an outside surface of the rim recessed from the main body of the filter base, a bottom section beneath the trough-like top section having a flat bottom outer surface, an inlet entry port connecting to a fluid source and communicating with the inlet port at the trough-like top section, the inlet port, in turn, connecting to the inlet of the filter housing, an outlet exit port connecting to a fluid delivery device and communicating with the outlet port at the trough-like top section, the outlet port connecting, in turn, with the outlet of the filter housing; and, a filter locking ring locking the filter housing to the filter base having a flat ring base, an upright wall touching a side outside surface of the filter housing when introduced through and around the filter housing, the upright wall extending from a peripheral tip at an interior border of the flat ring base and recessed from the exterior peripheral tip of the flat ring base, a pin like protrusion at an inside surface of the flat ring base inserting into the female receptor of the filter base when the filter locking ring locks the filter housing to the filter base. The upright protruding rim of the filter base surrounds an outside bottom portion of the filter housing when the filter housing is engaged with the filter base. The filter inside the filter housing may be permanently housed, that is, not replaceable and the bottom cover and the domelike cover of the filter housing are permanently attached to each other. To be able to control the residence time of contact between the filter and the fluid, the inlet and outlet at the bottom cover can be made to be replaceable and its inside diameter varied. For example, with the same inlet flow rate of the liquid into the filter housing, an outlet with a smaller inside diameter will provide more retention time for the liquid to contact the filter. Aside from matching the inlet and outlet at the filter housing with those at the filter base, a nib at the filter base and a matching indentation at the filter housing and vice versa may be used to further position the filter housing with the filter base. The bottom section of the filter base may be hollow or solid. The female receptor on the filter base may be designed as a tract where the pin like protrusion at the filter locking ring slips into and situates at an end of the tract when the filter locking ring connects with the filter base, thereby locking the filter base to the filter housing. It is recommended to have a tapered tract for ease of entry by the pin without sacrificing the snugness needed to keep the pin at the end of the tract. A notation on the direction of the twisting motion to lock the filter base with the filter housing may be printed, embossed or etched at a top surface of the flat ring base. A felt mat be placed on the inside surface of the bottom cover of the filter housing to prevent filter particles from mixing with or contaminating the filtered effluent fluid flowing from the filter assembly. A plurality of protruding lines on an inside surface of the upright cylindrical wall of the filter locking ring provide clearance between the filter housing and the upright cylindrical wall while the plurality of protruding lines on an outside surface of the upright cylindrical wall of the filter locking ring provide a grip when handling the filter locking ring.

A method for assembling the counter top fluid filter assembly herein having a filter housing with a filter therein and an inlet and an outlet, a filter base including a cylindrical trough-like top section having a flat interior surface, an upright protruding rim extending from the flat interior surface of the filter base proximal to the periphery having connectors on an outside surface of the rim recessed from a main body of the filter base, an inlet port and an outlet port communicating with the inlet and outlet of the filter housing, a bottom section beneath the trough-like top section having an inlet entry port connecting to a fluid source and communicating with the inlet port at the trough-like top section, the inlet port connecting to the inlet of the filter housing, an outlet exit port connecting to a fluid delivery device and communicating with the outlet port of the trough-like top section, the outlet port connecting with the outlet of the filter housing and a filter locking ring locking the filter housing to the filter base having a flat ring base, an upright wall touching a side outside surface of the filter housing, a matching connector at an inside surface of the flat ring base connecting to the connector at the filter base, comprise the steps of: a) placing the filter housing on top of the filter base; b) engaging the inlet of the filter housing with the inlet port of the filter base and the outlet of the filter housing with the outlet port of the filter base; c) introducing the filter locking ring through and around the filter housing; d) lowering the filter locking ring through the filter housing to a position where the matching connector is engageable to the connector on the filter base; and, e) connecting the matching connector at the filter locking ring with the connector at the filter base, thereby locking the filter base to the filter housing.

The fluid filter assembly may be supplied as a kit. As a kit, aside from the filter housing or filter cartridge, the filter base and the filter locking ring described herein, adaptor/s for connecting the fluid entry port at the filter base of the filter assembly with the fluid source; a fluid delivery device such as a spout for the filtered effluent fluid; replaceable inlet and outlet devices with differing inside diameter for the filter housing; and, extra gaskets will be supplied.

Other embodiments of the present invention will become readily apparent to those skilled in the art from the following detailed description, wherein it shows and describes only certain embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWING

Aspects of the present invention are illustrated by way of example, and not by way of limitation, in the accompanying drawings, wherein.

DETAILED DESCRIPTION

The detailed description represented herein is not intended to represent the only way or the only embodiment in which the claimed invention may be practiced. The description herein is provided merely as an example or examples or illustrations of the claimed invention and should not be construed as the only way or as preferred or advantageous over other embodiments or means of practicing the invention. A filter assembly constructed the same or similarly to those illustrated and described herein is within the scope of this invention. The detailed description includes specific details to provide a thorough understanding of the claimed invention and it is apparent to those skilled in the art that the claimed invention may be practiced without these specific details. In some instances, well known structures and devices or structures that do not form a part of the invention may be lightly lined and/or shaded in order to avoid obscuring the main concepts of the invention.

The use of the terms "comprise", "comprises", "comprising" and the like means that a collection of objects or parts is not limited to those objects or parts specifically recited.

Figure 1:
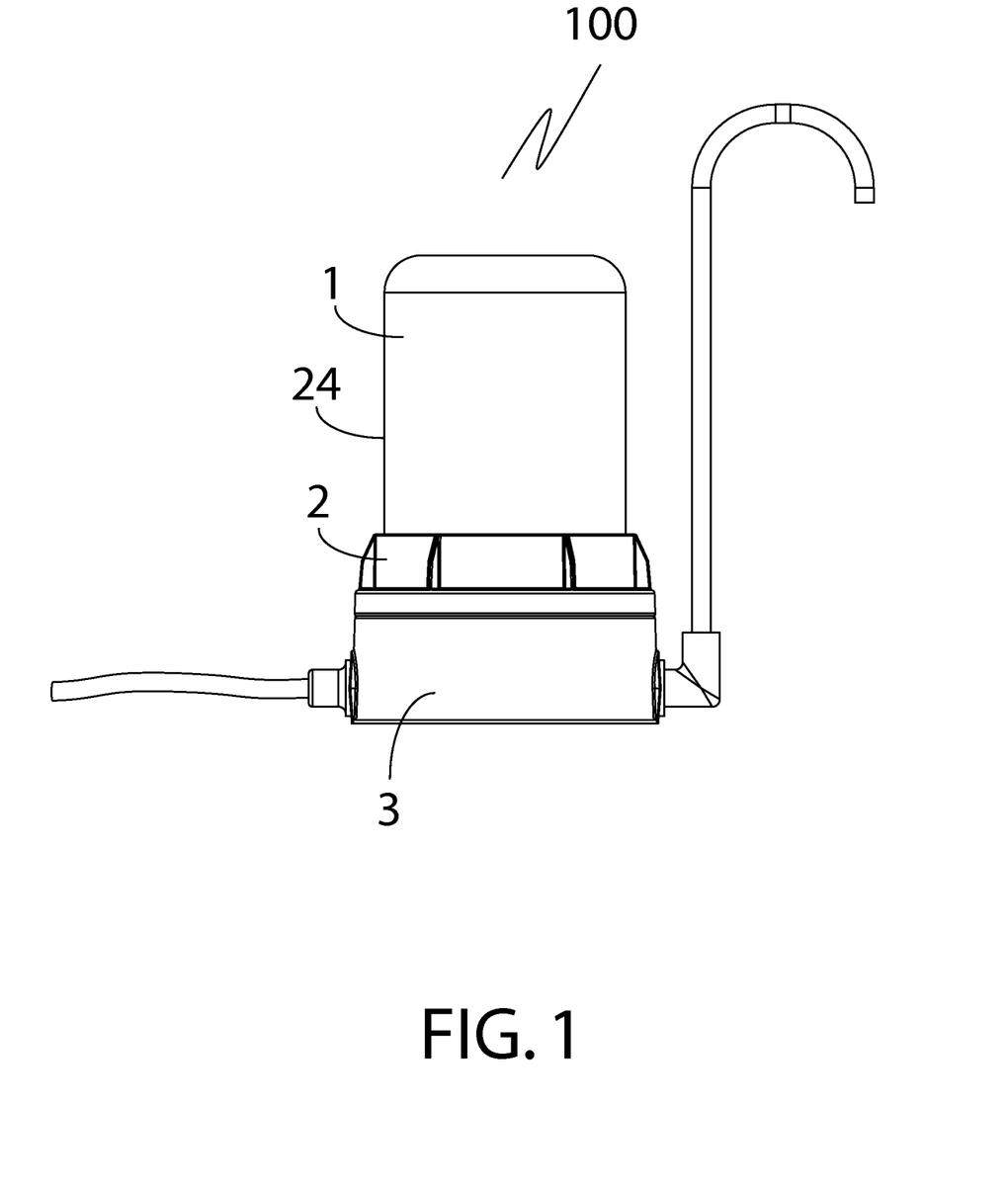
FIG. 1 is a perspective view of the assembled filter assembly.
Figure 1A:
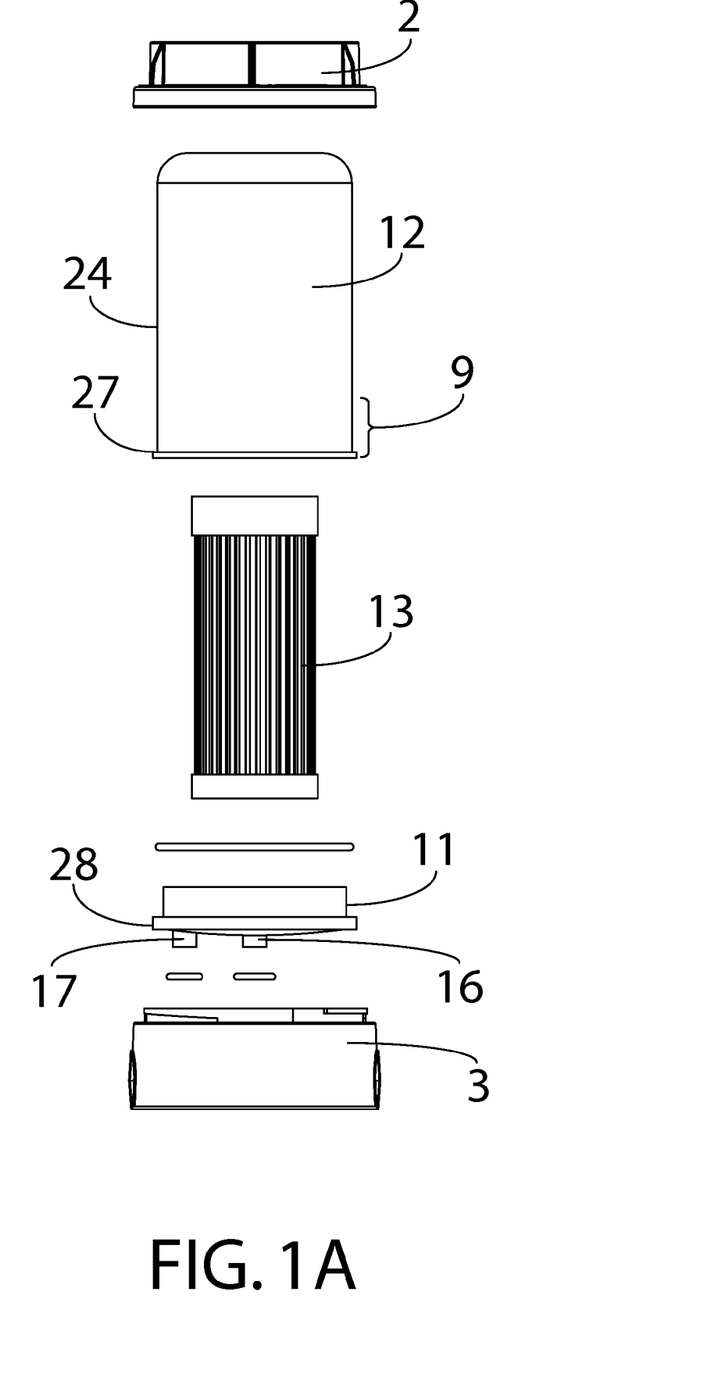
FIG. 1A is an exploded view of the filter housing assembly showing its parts.
Figure 1B:
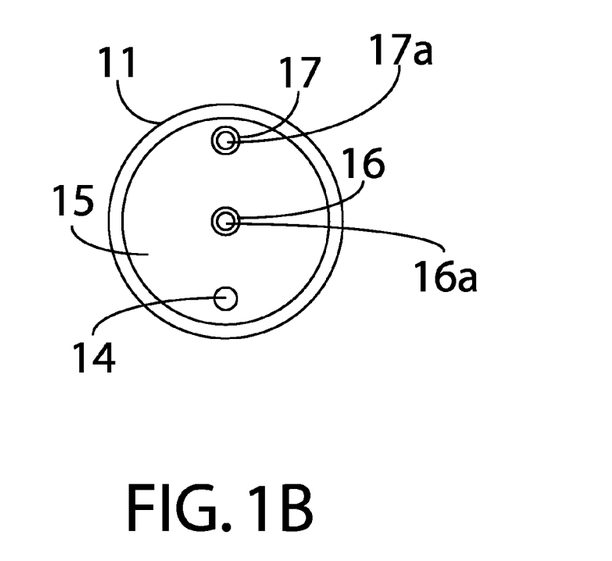
FIG. 1B is a plan view of the outside surface of the bottom cover of the filter housing.
Figure 1C:
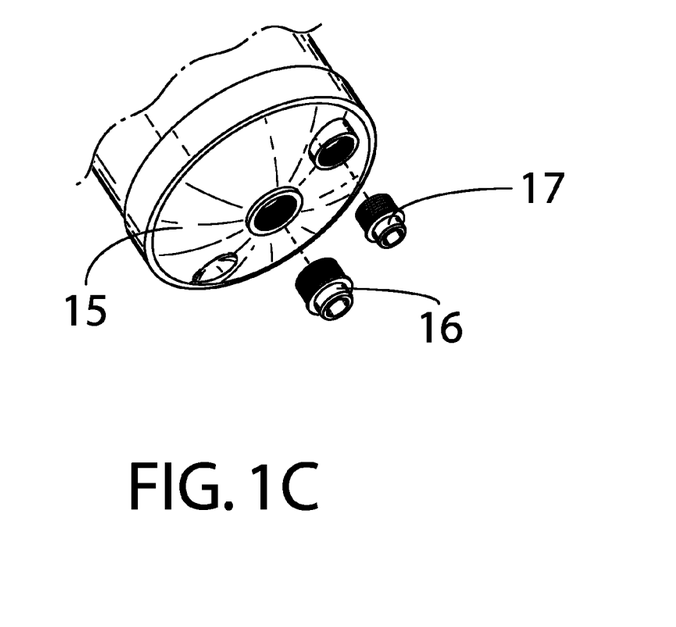
FIG. 1C is a perspective view of the outside surface of the bottom cover showing the replaceable inlet and outlet.
Figure 2:
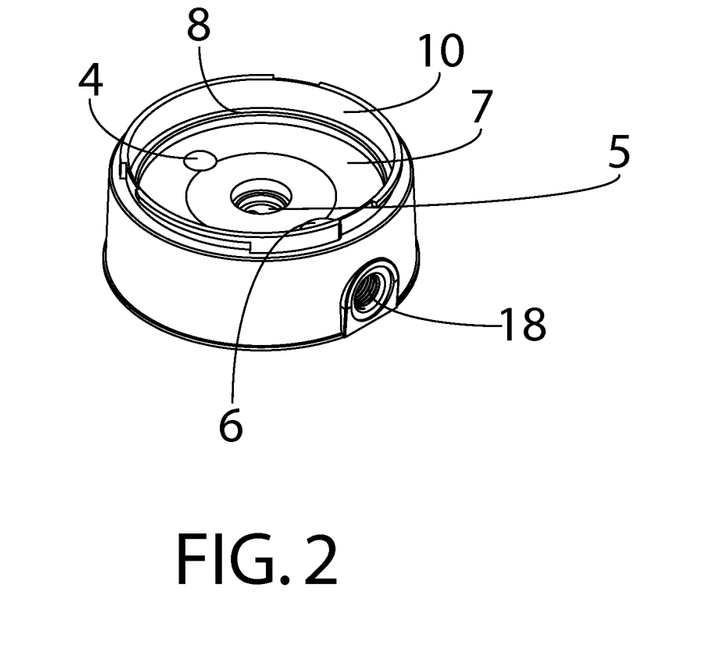
FIG. 2 is a perspective view of the filter base of the filter assembly.
Figure 3:
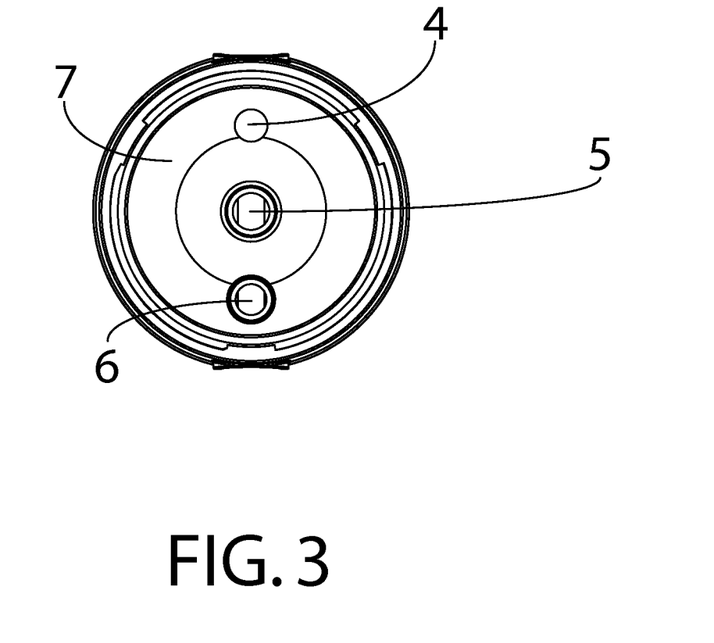
FIG. 3 is a plan view of the interior of the top section of the filter base.
Figure 3A:
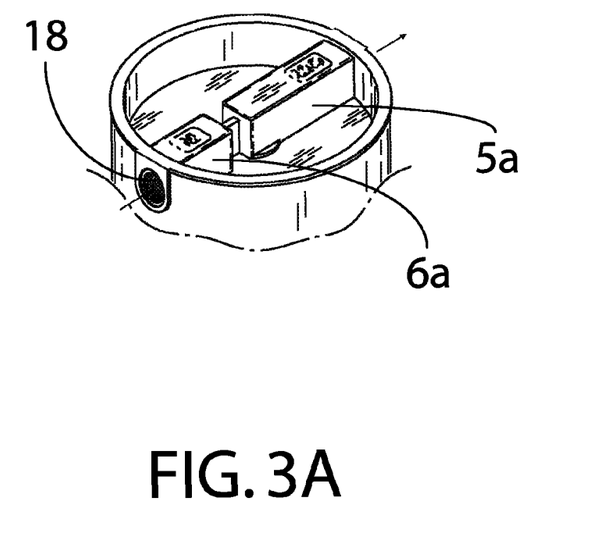
FIG. 3A is a perspective view of the interior bottom section of the filter base showing the fluid pathways of the inlet port and the outlet port.
Figure 4A:
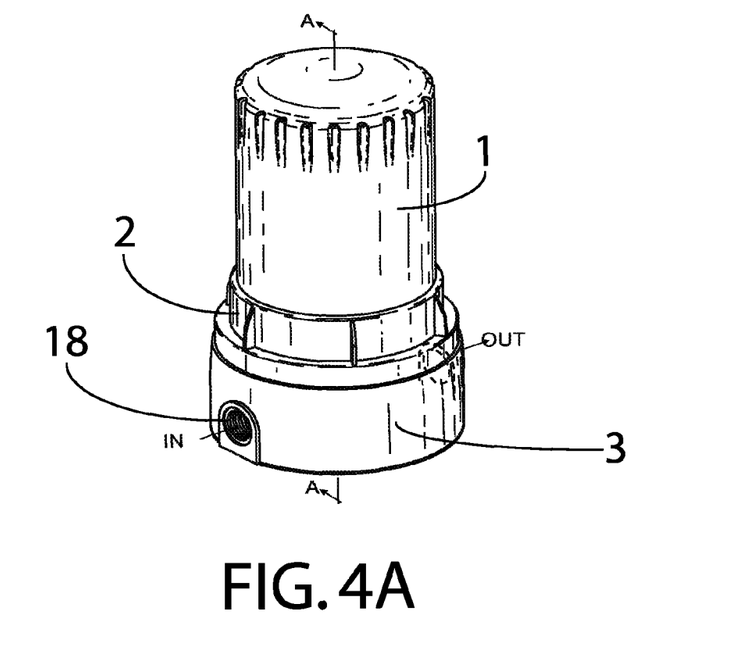
FIG. 4A is a perspective view of the filter assembly without the spout.
Figure 4B:
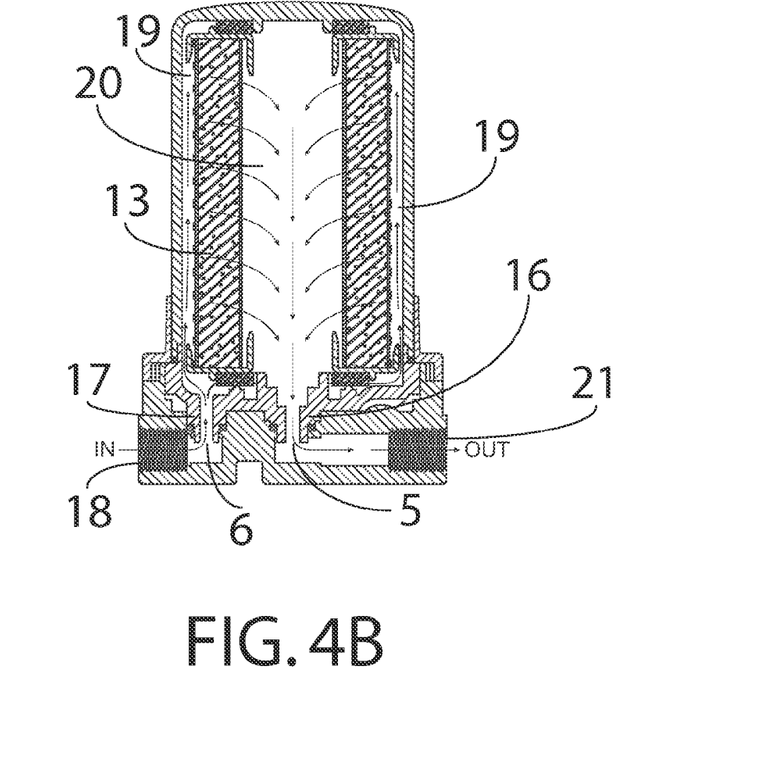
FIG. 4B is a cross sectional view taken along A-A of a filter assembly of FIG. 4A. showing the filtration flow of the fluid.

FIG. 1 is a perspective view of an example of a filter assembly 100 designed according to the stated desired functions of the filter assembly. The filter assembly comprise mainly of a filter housing 1, a filter locking ring 2 and a filter base 3. A perspective view of the filter base 3 is shown in FIG. 2 and the plan view is shown in FIG. 3. The filter base 3 has an optional protruding rounded nib 4, an outlet port 5 and an inlet port 6 for the fluid. As shown here, the outlet port 5 is at the middle and the inlet port 6 is on the side, opposite the nib 4. The positions of the inlet and the outlet can be interchanged. The outlet port 5 and the inlet port 6 are bored from a flat interior surface 7 of the filter base 3. At the periphery of the inside flat interior surface 7 of the filter base 3 is an elevated flat ring 8 which holds and positions the filter housing 1 and surrounds the outside bottom portion 9 of the filter housing. An upright protruding rim 10 extends from and around the filter base, proximal to the periphery. The flat interior surface 7 bordered by the upright protruding rim 10 results in a cylindrical trough-like top section of the filter base 3 with the flat interior surface 7 serving as the bottom surface, hereinafter referred to simply as bottom surface 7, and the protruding rim 10 as the walls. The filter base 3 extends continuously from the top of the rim 10 to a bottom section extending below the bottom surface 7 of the cylindrical trough-like top section. Underneath the bottom surface 7 of the filter base are the covered pathways 5a for the outlet port 5 and 6a for the inlet port 6 of the fluid. The bottom section beneath the bottom surface 7 of the top section of the filter base may be hollow or solid. The bottom outer surface of the bottom section of the filter base is flat to be able to stand upright on top of a flat surface like a counter top or a table. The total height of the filter base depends on the total size and weight of the filter assembly 100. It should have a height that will stably hold a filter cartridge or a filter housing with a filter therein, upright on top of the counter or table especially during usage. The filter housing 1 is generally made up of two parts, a bottom cover 11 and a hollow domelike top cover 12 fully enveloping a selected filter 13 for filtering the fluid as shown in FIG. 1A. The domelike top cover 12 attaches to the bottom cover 11 after the filter is introduced inside the filter housing 1. There are many known mechanisms for attaching the top cover with the bottom cover such as a male screw at the outside surface of the bottom cover engaging with a matching female screw on the inside surface of the top cover or vice versa. In this type of connection, gaskets are often introduced at the bottom of the male screw around the base of the bottom cover at the junction where the top cover attaches to the bottom cover, to seal the filter housing. The bottom cover can also attach to the top cover by snap fit, also recommended to have a gasket for better seal. The bottom cover can also be permanently attached to the top cover for example by ultrasound welding, in which case, the filter housing 1 and the filter 13 will be together in one filter cartridge where the filter will not be replaceable so one has to change the whole cartridge to change the filter inside. The latter is referred to herein as a filter cartridge when the filter is permanently housed inside the filter housing. Since the filter is secured inside the cartridge, leakage of the fluid during disassembly is minimal, if any. Glues that can permanently bond the top cover with the bottom cover and prevent leakage can also be used instead of ultrasound welding. When the filter housing 1 is laid on top of the filter base 3, the protruding rounded nib 4 on the filter base 3 rests on a matching indentation 14 located at the outside bottom surface 15 of the filter housing 1. The position of the nib and the matching indentation may be reversed, that is, the nib will be at the surface 15 of the filter housing while the indentation will be at the filter base. The flat ring 8, the rim 10 and the nib 4 situating on the indentation 14 of the filter housing 1 keeps the filter housing 1 situated on top of the filter base 3 before it is locked in place by the filter locking ring. Also at the bottom surface 15 of the filter housing are the outlet 16 and the inlet 17 which rest or insert into the matching outlet port 5 and inlet port 6 of the filter base 3 shown in FIG. 1B. The outlet 16 and inlet 17 follows the flow orientation of the matching outlet port 5 and inlet port 6. Gaskets are also often used to seal the inlet and outlet of the filter housing with the inlet and outlet of the filter base, respectively. There are various known mechanisms used for holding a filter housing on top of the filter base. The method used that is shown in FIGS. 1A and 4A is merely an example. An example of the flow of the liquid inside the filter housing is shown by an arrow. The fluid from the fluid source enters from the inlet entry port 18 on the filter base 3 through the inlet port 6 and into the inlet 17 of the filter housing 1 holding the filter. The fluid contacts the filter 13 as it enters and fills a chamber 19 around the filter 13. In this example, as the fluid gets filtered, the filtered effluent goes into a second chamber 20 isolated from the chamber 19 and flows out from the outlet 16 and into the outlet port 5 which connects to a fluid outlet exit port 21 which is typically connected to a fluid delivery device such as a spout where the filtered fluid is made available for use. The entry of the fluid through the filter housing is controlled by a knob on the fluid source, typically a knob on a faucet connected to a fluid reservoir. A fluid adjusting valve (not shown) can also be placed between the fluid inlet entry port 18 and the fluid inlet port 6 to control the flow of the fluid. Another way to regulate the flow and consequently, the retention time of the fluid with the filter is to provide an inlet 17 and outlet 16 with an opening 16a or 17a of different inside diameters. In this case, to facilitate the adjustment, the inlet 17 and the outlet 16 are replaceable, i.e. not permanently affixed to the outside surface of the bottom cover of the filter housing 11. Instead, for convenience in replacing one outlet of one diameter with another outlet of another diameter and one inlet of one diameter with another inlet of another diameter, these would attach for example by snapping in or by a screw mechanism to the outside surface of the bottom cover of the filter housing as shown in FIG. 1C.

Figure 5:
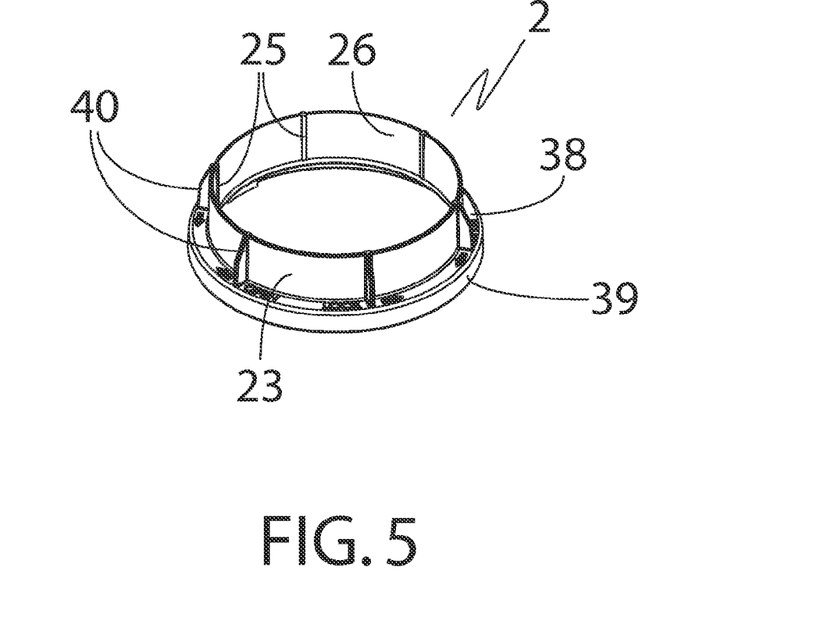
FIG. 5 is a perspective view of the filter locking ring.
Figure 6:
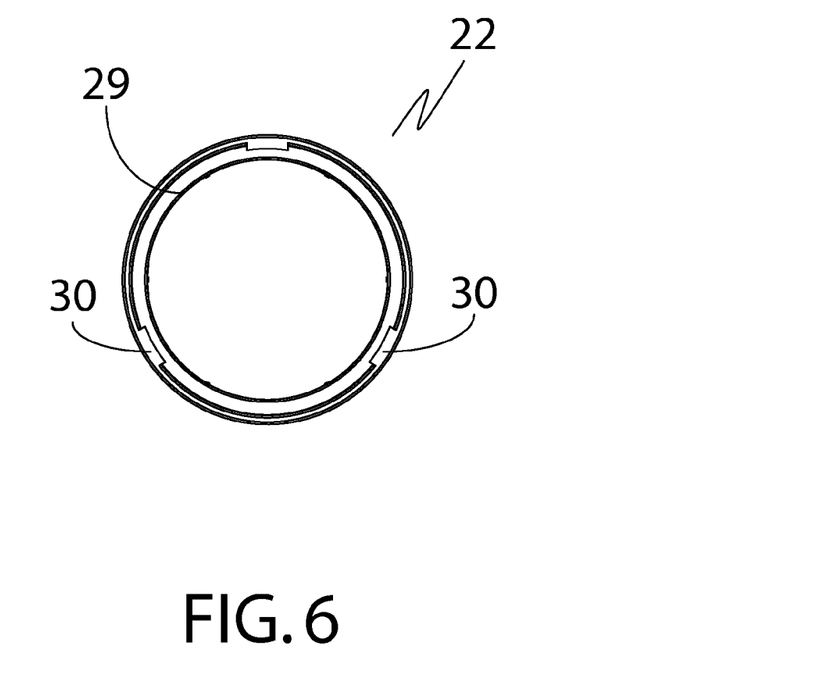
FIG. 6 is a plan view of the rear inside surface of the filter locking ring.
Figure 7A:
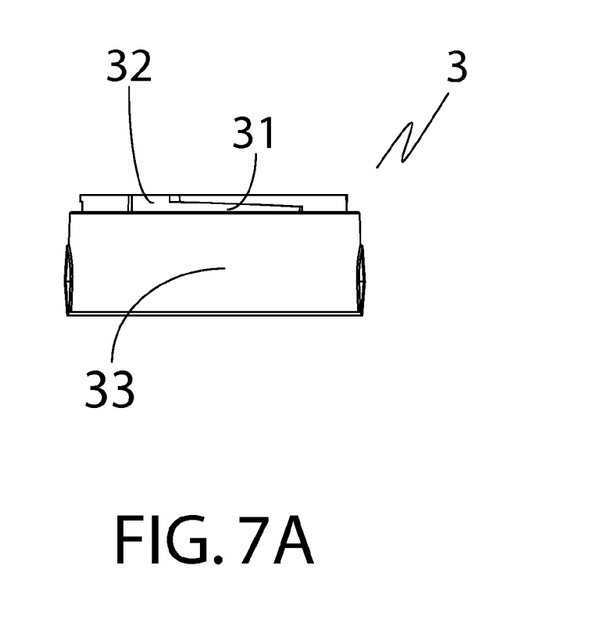
FIG. 7A is a side view of the filter base.
Figure 7B:
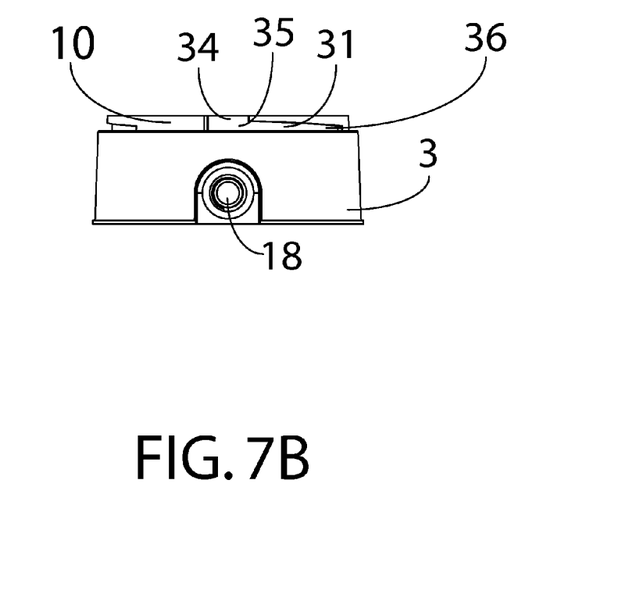
FIG. 7B is a side view of the filter base showing the inlet entry port on the base.

The filter housing 1 is secured to the filter base 3 by a filter locking ring 2. FIG. 5 shows a perspective view of the filter locking ring 2 and FIG. 6 shows a plan view of the rear inside surface 22 of the filter locking ring 2. The filter locking ring as the name denotes is a ring with an upright cylindrical wall 23 that touches on the side outside surface 24 of the filter housing 1 when the locking ring is introduced through and around the filter housing. The cylindrical wall 23 extends upward from the inside peripheral tip 29 of the interior border at the base 38 of the filter locking ring 2. The base 38 is a flat ring. Consequently, the cylindrical wall 23 is recessed from the exterior lateral peripheral tip 39 of the flat ring base 38 of the locking ring 2. For added stability and ease of removing the locking ring 2 from the housing 1, there are usually protruding lines 25 located opposite each other on the inside surface 26 of the upright cylindrical wall 23 that touches on the outside surface 24 of the filter housing instead of the upright cylindrical wall 23. The lines 25 leave some clearance between the filter housing 1 and the wall 23 of the locking ring 2 therefore avoiding any frictional force when removing the filter locking ring from the filter housing. There are also a plurality of protruding lines 40 on an outside surface of the upright cylindrical wall 23 of the filter locking ring to provide a grip for the filter locking ring. In this example, at the bottom of the top cover of the filter housing 1 is a lip 27 having an outside surface aligning laterally with the outside peripheral surface 28 of the bottom cover 11 of the filter housing 1. The inside peripheral tip 29 at the base of the cylindrical wall 23 of the locking ring 2 rests on top of the lip 27 of the filter housing 1 before locking the filter housing with the filter base 3. The lip 27 of the filter housing serves as a positioning stopper on the filter locking ring 2 because the tip 29 rests on top of the lip 27 of the filter housing before the filter housing is secured or locked to the filter base. The filter housing is locked to the filter base when the filter locking ring connects to the filter base. For maintaining the quick connect feature of the filter assembly herein, the filter locking ring 2 locks or retains the filter housing 1 to the filter base 3 using a bayonet type connection. An example of a bayonet type connection is shown here, however, several modifications using the principle of the bayonet connection can be used. Further, other forms of quick connect like the screw mechanism and the twist and lock mechanism as shown in FIGS. 5A and 5B of U.S. Pat. No. 6,656,334 can also be used. In the bayonet type connection, a matching connector, herein as example, several elongated male pin like protrusion 30, simply referred to as pins, at an inside surface of the base of the filter locking ring 2 connects with the connector, herein as example, a female receptor 31, on the outside surface 32 of the upright rim 10 recessed from the main body 33 of the filter base 3 as shown in FIGS. 7A and 7B. To lock the filter housing to the filter base, the locking ring is introduced through and around the filter housing until the pins 30 are situated in front of the openings 34 and made to slip from the entry 35 of the female receptors 31 through to the end 36 of a tract by twisting the filter locking ring in the direction from the entry to the end of the tract while holding the filter base and turning this in an opposite direction from that of the filter locking ring 2 positioned around the filter housing 1. When the tip of the pins reach the end 36 and rest on the top surface of the main body 33 (which is also the bottom surface of the opening 34), the filter housing is locked to the filter base. Note that the female receptor 31, for a more secured lock, has a tapered tract with the space for the pin at the entry 35 slightly wider than the space at the end 36 where the pin 30 rests and snugly fits into after turning to lock the filter housing with the filter base. The locking direction for convenience, may be indicated by a notation and/or an arrow etched at the top surface 38 of the flat ring base of the filter locking ring.

Figure 8:
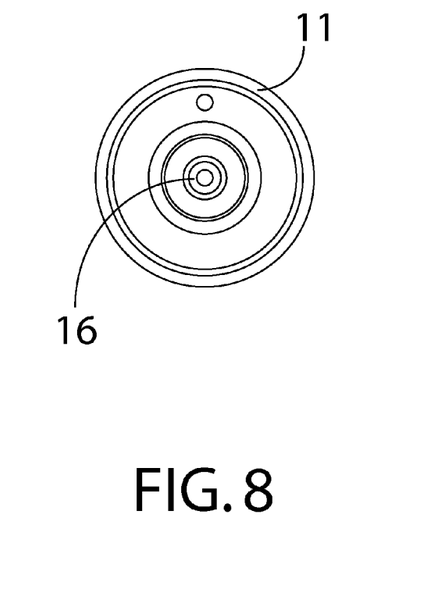
FIG. 8 shows a perspective view of the inside bottom cover of the filter housing without a felt at the opening of the outlet.
Figure 8A:
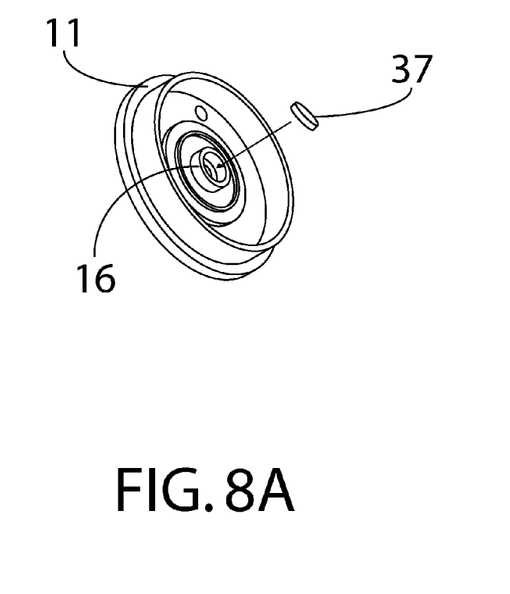
FIG. 8A is a plan view of the inside bottom cover of the filter housing showing where a felt resides at the opening of the outlet.

The inlet entry port 18 on the filter base usually has a female screw to match a male screw at the end of a tubing connected to a fluid source. To prevent any particles from the media flowing into the outlet of the effluent filtered fluid, the outlet 16 on the inside surface of the bottom cover 11 may be covered with felt 37 which can be glued or ultrasonically welded to the outlet, the latter type of attachment is preferred to avoid the felt 37 from being removed in case the fluid that is being filtered reacts with the glue.

This filter assembly shown in FIG. 1 is easily dismantled by simply unlocking the filter locking ring with a twisting action opposite in direction from the twisting action used to connect the filter locking ring to the filter base and consequently lock the filter base with the filter housing. After unlocking, the filter locking ring may be removed if desired and the filter housing is disconnected from the filter base. Once the two parts are disconnected, if the filter housing is one where the filter is removable, one simply unscrews (if the screw mechanism was used) the bottom cover 11 from the top domelike cover 12 to access and change the filter. The filter can also be removed even without removing the filter locking ring around the filter housing. If the filter is in the form of a cartridge, the entire filter cartridge is removed from the filter locking ring and discarded or replaced with another filter cartridge. The filter assembly is portable because the inlet port on the filter base can be made to connect with the outlet port of a fluid source by simply using adaptors if the outlet port of the fluid source is not one of a standard opening. The filter assembly is designed to have a filter base able to stand on top of a counter. To be able to carry this conveniently during travel, it is designed to have an inlet port that can connect to the fluid source by having for example, a female screw on the inside surface of the outlet port. If the outlet port of the fluid source does not have a matching male screw, one simply can use an adapter that has a male screw on one end connecting to the inlet port of the filter base with a connector on the other end that matches or is compatible with the outlet port of the fluid source. The filter assembly is constructed with plastic materials if one desires a filter assembly that is lightweight. The whole assembly or parts thereof can also be made of metal, one that will not corrode with time or with the fluid. The assembly can also be made out of glass but this will be more fragile to handle. The filter assembly can be conveniently supplied with an accessory kit having the accessories mentioned above and if the inlet and the outlet at the bottom cover of the filter housing is replaceable, the kit will also include these replaceable inlet and outlet with varying inside diameter.

While the embodiments of the present invention have been described, it should be understood that various changes, adaptations, and modifications may be made therein without departing from the spirit of the invention and the scope of the claims.

I claim:

1. A portable counter top fluid filter assembly, comprising:
   a filter housing having a bottom cover and a hollow domelike cover enveloping a filter attaching to the bottom cover, the bottom cover including an inlet and an outlet;
   a filter base having a main body including a cylindrical trough-like top section having a flat interior surface, an inlet port and an outlet port, an elevated flat ring at the flat interior surface periphery, an upright protruding rim extending from the flat interior surface of the filter base proximal to the periphery and surrounding an outside bottom portion of the filter housing when the filter housing is engaged with the filter base, the protruding rim having female receptors on an outside surface of the rim recessed from the main body of the filter base, a bottom section beneath the trough-like top section having a flat bottom outer surface, an inlet entry port connecting to a fluid source and communicating with the inlet port of the trough-like top section, the inlet port connecting to the inlet of the filter housing, an outlet exit port connecting to a fluid delivery device and communicating with the outlet port of the trough-like top section, the outlet port connecting with the outlet of the filter housing; and,
   a filter locking ring locking the filter housing to the filter base having a flat ring base, an upright wall touching a side outside surface of the filter housing when introduced through and around the filter housing, the upright wall extending from a peripheral tip at an interior border of the flat ring base and recessed from the exterior peripheral tip of the flat ring base, a pin like protrusion at an inside surface of the flat ring base inserting into the female receptor of the filter base when the filter locking ring locks the filter housing to the filter base.

2. The portable counter top fluid filter assembly of claim 1 wherein the filter is permanently housed inside the filter housing.

3. The portable counter top fluid filter assembly of claim 1 wherein the inlet and outlet at the bottom cover are replaceable.

4. The portable counter top fluid filter assembly of claim 3 wherein the inlet and outlet have different inside diameters.

5. The portable counter top fluid filter assembly of claim 1 further comprising a nib and a matching indentation for positioning the filter housing with the filter base.

6. The portable counter top fluid filter assembly of claim 1 wherein the bottom section of the filter base is hollow or solid.

7. The portable counter top fluid filter assembly of claim 1 wherein the female receptor is a tract accommodating the pin like protrusion, the pin like protrusion situating at an end of the tract when the filter locking ring connects with the filter base, thereby locking the filter base to the filter housing.

8. The portable counter top fluid filter assembly of claim 7 wherein the tract is tapered.

9. The portable counter top fluid filter assembly of claim 1 further comprising a locking direction at a top surface of the flat ring base.

10. The portable counter top fluid filter assembly of claim 1 wherein an inside surface of the bottom cover of the filter housing is covered by a felt.

11. The portable counter top fluid filter assembly of claim 1 further comprising a plurality of protruding lines on an inside surface of the upright cylindrical wall of the filter locking ring to provide clearance between the filter housing and the upright cylindrical wall.

12. The portable counter top fluid filter assembly of claim 1 further comprising a plurality of protruding lines on an outside surface of the upright cylindrical wall of the filter locking ring to provide a grip for the filter locking ring.

13. A method for assembling a counter top fluid filter assembly having a filter housing with a filter therein and an inlet and an outlet, a filter base including a cylindrical trough-like top section having a flat interior surface, an upright protruding rim extending from the flat interior surface of the filter base proximal to the periphery having connectors on an outside surface of the rim recessed from a main body of the filter base, an inlet port and an outlet port communicating with the inlet and outlet of the filter housing, a bottom section beneath the trough-like top section having an inlet entry port connecting to a fluid source and communicating with the inlet port at the trough-like top section, the inlet port connecting to the inlet of the filter housing, an outlet exit port connecting to a fluid delivery device and communicating with the outlet port of the trough-like top section, the outlet port connecting with the outlet of the filter housing and a filter locking ring locking the filter housing to the filter base having a flat ring base, an upright wall touching a side outside surface of the filter housing, a matching connector at an inside surface of the flat ring base connecting to the connector at the filter base, comprising:

a) placing the filter housing on top of the filter base;
b) engaging the inlet of the filter housing with the inlet port of the filter base and the outlet of the filter housing with the outlet port of the filter base;
c) introducing the filter locking ring through and around the filter housing;
d) lowering the filter locking ring through the filter housing to a position where the matching connector is engageable to the connector on the filter base; and,
e) connecting the matching connector at the filter locking ring with the connector at the filter base, thereby locking the filter base to the filter housing.

14. A fluid filter assembly kit, comprising:

a filter housing having a bottom cover and a hollow dome-like cover enveloping a filter attaching to the bottom cover, the bottom cover including an inlet and an outlet;

a filter base having a main body including a cylindrical trough-like top section having a flat interior surface, an inlet port and an outlet port, an elevated flat ring at the flat interior surface periphery, an upright protruding rim extending from the flat interior surface of the filter base proximal to the periphery and surrounding an outside bottom portion of the filter housing when the filter housing is engaged with the filter base, the protruding rim having female receptors on an outside surface of the rim recessed from the main body of the filter base, a bottom section beneath the trough-like top section having a flat bottom outer surface, an inlet entry port connecting to a fluid source and communicating with the inlet port of the trough-like top section, the inlet port connecting to the inlet of the filter housing, an outlet exit port connecting to a fluid delivery device and communicating with the outlet port of the trough-like top section, the outlet port connecting with the outlet of the filter housing;

a filter locking ring locking the filter housing to the filter base having a flat ring base, an upright wall touching a side outside surface of the filter housing when introduced through and around the filter housing, the upright wall extending from a peripheral tip at an interior border of the flat ring base and recessed from the exterior peripheral tip of the flat ring base, a pin like protrusion at an inside surface of the flat ring base inserting into the female receptor of the filter base when the filter locking ring locks the filter housing to the filter base;

an adaptor for connecting the fluid entry port of the filter assembly with the fluid source;

a fluid delivery device;

replaceable inlet and outlet devices for the filter housing; and, extra gaskets.

15. The fluid filter assembly kit of claim 14 wherein the fluid delivery device is a spout.

* * * * *